United States Patent [19]

Hernandez Gonzalez

[11] 3,970,169

[45] July 20, 1976

[54] GANGWAY LADDER

[76] Inventor: Bernabe Hernandez Gonzalez, Calle Villalba Hervas 12°, Santa Cruze de Tenerife (Canarias), Spain

[22] Filed: Nov. 7, 1975

[21] Appl. No.: 630,063

[30] Foreign Application Priority Data

Mar. 8, 1975  Spain .................................. 210608

[52] U.S. Cl. ...................................... 182/1; 14/71.1
[51] Int. Cl.² ...................... B65G 11/00; E06C 9/06
[58] Field of Search ..................... 182/1, 82, 93, 97; 14/71

[56] References Cited
UNITED STATES PATENTS

| 616,515 | 12/1898 | Williams | 182/1 |
|---|---|---|---|
| 1,419,834 | 6/1922 | Fellows | 182/1 |
| 2,466,708 | 4/1949 | Kamps | 182/1 |
| 2,888,182 | 5/1959 | Nixon | 182/1 |
| 3,731,761 | 5/1973 | Glenn | 182/1 |

*Primary Examiner*—Reinaldo P. Machado
*Attorney, Agent, or Firm*—William A. Drucker

[57] ABSTRACT

A gangway-ladder, for connecting a floating mooring platform to the shore whilst accommodating changes of level of the platform due to tides, has a guide structure with channels received individual steps capable of forming a ladder, the floating platform having beams engaging under the steps so that, as the platform rises with the tide, te beam means engage under the steps and successively lift them until, at the highest position of the platform, the steps are all in a horizontal plane.

4 Claims, 4 Drawing Figures

GANGWAY LADDER

The object of the present invention is to provide a gangway-ladder, for craft mooring, having movable steps which, due to the action of the tides, gradually change from a gangway to a ladder and vice versa, thus overcoming the difference in level between the shore and the constantly changing plane of the sea, whereby if the sea rises to reach high tide the steps will be at one level thereby forming a gangway, while if the sea drops to reach low tide, the steps will descend, thereby forming a ladder.

The gangway-ladder described herein fulfills this objective by establishing a means of joining the dry land and a floating mooring platform subjected to differences in level which frequently reach several meters, and presents the advantage over traditional means, based on normal ladders or gangways of variable inclination, that the steps making up the gangway-ladder are always out of the water without being submerged in the sea at any time, thereby avoiding the dangers inherent in a surface slippery due to moisture, grease and seaweed brought in by the sea water.

SUMMARY OF THE INVENTION

According to the invention, a gangway-ladder, for connecting a floating mooring platform to a dockside wall, comprises:

i. a guide structure secured to the dockside wall and defining a plurality of parallel vertical guide channels disposed in a row extending outwardly from the dockside wall, the base of each successive channel considered in the direction away from the dockside wall being lower than the base of the preceding channel, ii. a plurality of parallel steps disposd one in each of said guide channels, iii. lifting beam means secured to the floating mooring platform and positioned to extend beneath the steps, and iv. coupling means connecting the floating mooring platform and the dockside wall such that the floating mooring platform is held at a fixed spaced relationship from said dockside wall but is able to move vertically with respect thereto.

For a better understanding of the present invention, an embodiment is hereinafter described with reference to the accompanying drawings, wherein.

Figure 1:
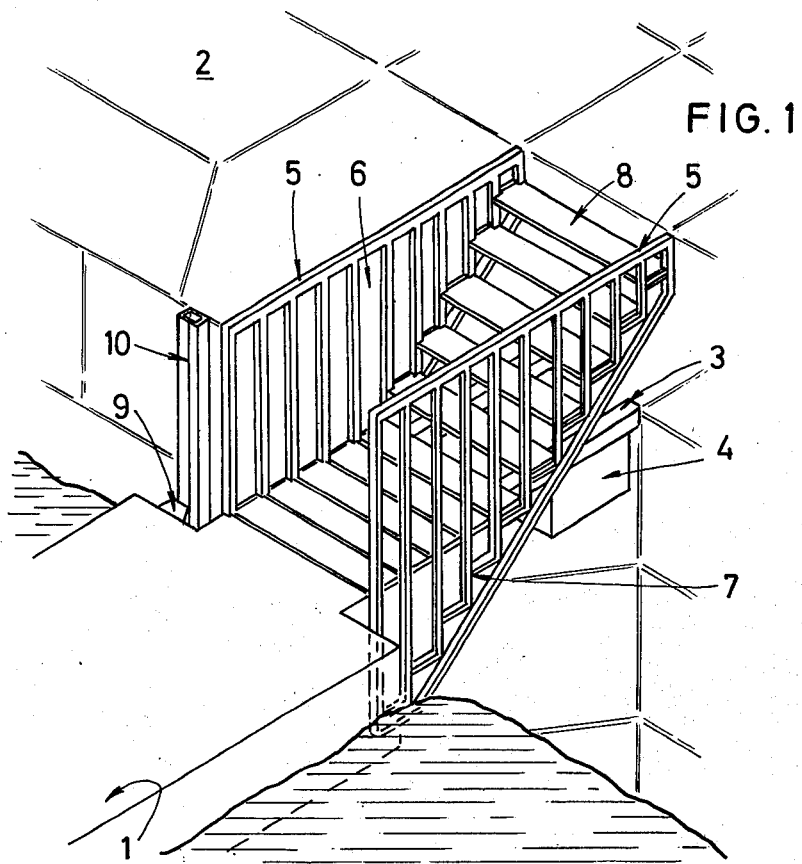
FIG. 1 is a perspective view of a gangway-ladder connected to a floating mooring platform.

In the drawing, a floating mooring platform 1 generally made of wood and at the sides of which the craft such as sporting craft are moored, is continually subject to the changing sea level which, with regard to the stationary level of the boarding zone 2, can be up to 10 meters or more, depending on the geographical location where it is situated. At the end nearest to land two beams 3, extending horizontally below the steps 8 to the vertical wall of the boarding zone 2, are fastened to the platform and are connected to a float of a suitable size so that the upper sides of the beams 3 define a horizontal plane identical to that of the platform 1 and so that the said float remains situated between a guide structure having two frames 5 which define the space for access from land to sea.

Figure 2:
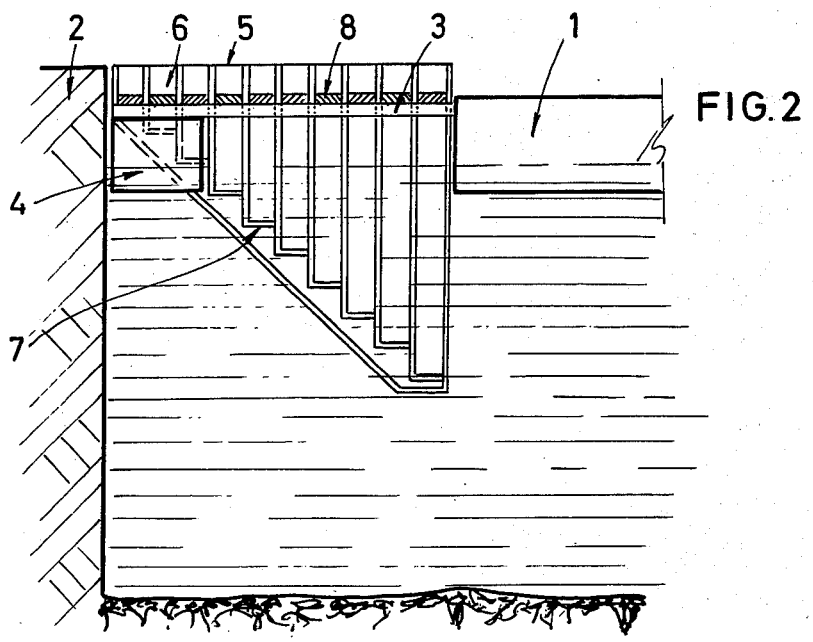
FIG. 2 is a side view of the gangway-ladder of FIG. 1, as it appears at high tide.
Figure 3:
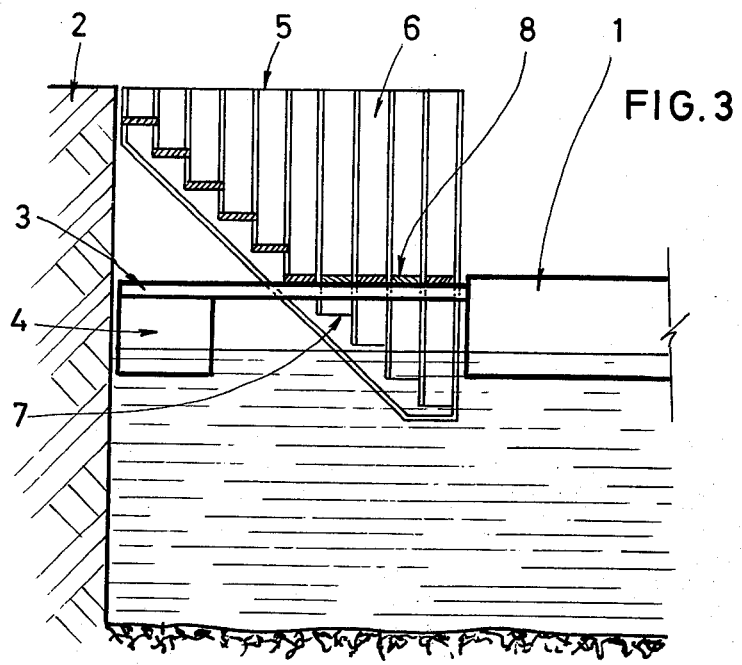
FIG. 3 is a side view of the gangway-ladder of FIG. 1, when the sea is at an intermediate level.
Figure 4:
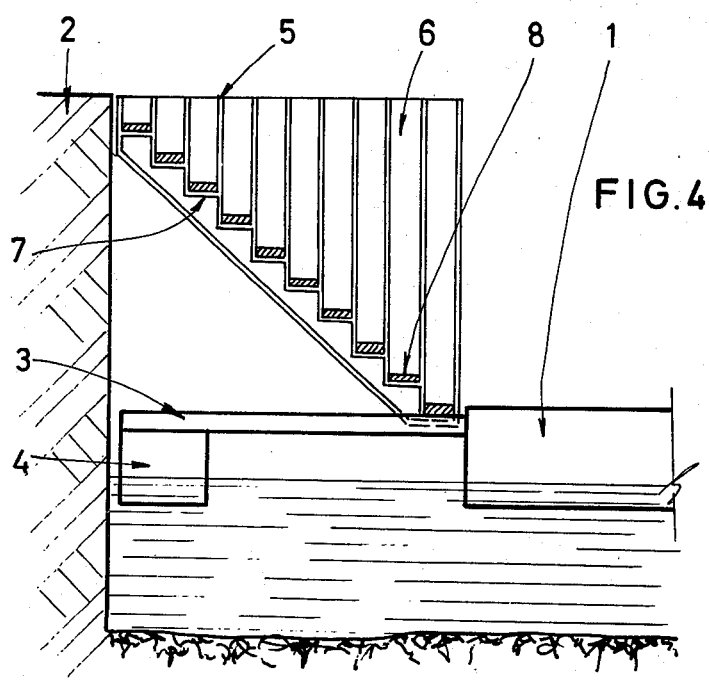
FIG. 4 is a side view of the gangway-ladder of FIG. 1 at low tide.

These frames 5 are identical and are mounted in a vertical position, the structure of each forming a series of parallel vertical guide channels 6 the bases 7 of which are situated at different levels descending by constant amounts so that the ends of parallel steps 8, which make up the ladder and which always remain free (see FIG. 1, where the structure of these steps is best illustrated) can rest in these channels. The channels are disposed in a row extending outwardly from the dockside wall. When the water level is at the lowest point determined by low tide, the beams 3 are likewise at their lowest level and remain beneath all the steps 8. However, when the water, and therefore the platform 1 and the float 4, begin to rise, the level of these beams 3 rises, thereby in their ascent picking up the last step 8 disposed at the lowest position adjoining the platform 1 and then, gradually but successively, they meet the remaining steps 8 in an ascending direction until reaching the highest level attained at high tide. The steps 8 then all appear situated one next to the other in the same horizontal plane, which will be the same as that of the platform 1 (see FIG. 2).

In order to prevent the beams 3 from moving away, due to motion of the water, at the end of the platform 1 where they are fastened, the platform 1 has two hook-up stops 9 which are housed within U-section uprights 10, disposed near the end of the frames 5 and joined to the boarding zone 2. The stops are trapped within the uprights 10, although able to move within them vertically as the tide rises and falls, and form coupling means connecting the platform and wall such that the platform is held at a fixed spaced relationship from the wall.

It will immediately be evident that the conversion of the ladder into a gangway and vice versa occurs gradually as the sea level rises and drops, with, in all cases, a comfortable and safe path obtained from the platform to the dry land, and vice versa.

I claim:

1. A gangway-ladder, for connecting a floating mooring platform to a dockside wall, comprising:
  i. a guide structure secured to the dockside wall and defining a plurality of parallel vertical guide channels disposed in a row extending outwardly from the dockside wall, the base of each successive chanel considered in the direction away from the dockside wall being lower than the base of the preceding channel,
  ii. a plurality of parallel steps disposed one in each of said guide channels,
  iii. lifting beam means secured to the floating mooring platform and positioned to extend beneath the steps, and
  iv. coupling means connecting the floating mooring platform and the dockside wall such that the floating mooring platform is held at a fixed spaced relationship from said dockside wall but is able to move vertically with respect thereto.

2. A gangway-ladder, as claimed in claim 1, wherein said guide structure consists of two laterally spaced guide frames mounted in parallel positions extending at right angles from the dockside wall.

3. A gangway-ladder, as claimed in claim 1, further comprising float means secured at the underside of the lifting beam means remote from the floating mooring platform.

4. A gangway-ladder, as claimed in claim 1, wherein said coupling means comprises slotted uprights secured on the dockside wall adjacent an end of the guide structure, and stop means mounted on the floating mooring platform and engaged slidably in said slotted uprights.

* * * * *